United States Patent [19]

Maxfield

[11] 4,058,081

[45] Nov. 15, 1977

[54] FULL TANK MARKER

[76] Inventor: Maureen Adele Maxfield, 44-01 34th Ave., Astoria, N.Y. 11101

[21] Appl. No.: 738,184

[22] Filed: Nov. 2, 1976

[51] Int. Cl.[2] .......................... F16K 37/00; G09F 3/08

[52] U.S. Cl. .......................................... 116/125; 40/332

[58] Field of Search .................... 116/125; 222/42, 41; 40/332

[56] References Cited

U.S. PATENT DOCUMENTS

| | | | |
|---|---|---|---|
| 1,586,781 | 6/1926 | Case et al. | 116/125 X |
| 2,363,424 | 11/1944 | Keenan | 222/23 X |
| 2,485,942 | 10/1949 | Turner | 116/125 |
| 3,010,743 | 11/1961 | Bengtson, Jr. | 40/332 X |
| 3,083,872 | 4/1963 | Meshberg | 222/42 X |
| 3,212,718 | 10/1965 | Green | 222/42 X |
| Re. 26,838 | 3/1970 | Pecis | 116/125 X |

*Primary Examiner*—Daniel M. Yasich
*Attorney, Agent, or Firm*—Leonard W. Suroff

[57] ABSTRACT

An indicating device for a tank containing a valve having a head for opening and closing the valve that includes a body portion having a top end and spaced apart bottom end with a peripheral surface therebetween, and indicia means on the top end of the body portion. Gripping means on the peripheral surface is provided to facilitate mounting and removal of the body portion from the valve head. Enclosing means extends vertically in the body portion upwardly from the bottom end, with a cavity having a pair of vertically extending spaced apart cavity walls adapted to receive therebetween the valve head, such that vertical mounting and removal of the body portion on the valve head by the gripping means is obtainable. Retaining means is connected to at least one of the cavity walls for releasably securing by frictional engagement the body portion to the valve head thereby requiring a force for mounting and removal of the device from a valve head.

9 Claims, 4 Drawing Figures

FULL TANK MARKER

BACKGROUND OF THE INVENTION

The present invention relates to an indicating device to indicate that a tank filled with a gas is "FULL".

In various applications, particularly in hospitals, it is most important to be aware when a tank containing life supporting gas is full. In surgery the anesthesia gases come from tanks having a valve on the upper end thereof with a head adapted to be opened and closed by hand.

OBJECTS OF THE INVENTION

An object of the invention is to provide an indicating device that may be easily placed on and removed from a tank containing various gases.

Another object of the invention is to provide an indicating device that may be economically manufactured.

Other objects and advantages of the present invention will become apparent as the disclosure proceeds.

SUMMARY OF THE INVENTION

An indicating device for a tank containing a valve having a head for opening and closing the valve that includes a body portion having a top end and spaced apart bottom end with a peripheral surface therebetween, and indicia means on the top end of the body portion. Gripping means on the peripheral surface is provided to facilitate mounting and removal of the body portion from the valve head.

Enclosing means extends vertically in the body portion upwardly from the bottom end with a cavity having a pair of vertically extending spaced apart cavity walls adapted to receive therebetween the valve head, such that vertical mounting and removal of the body portion on the valve head by the gripping means is obtainable. Retaining means is connected to at least one of the cavity walls for releasably securing by frictional engagement the body portion to the valve head thereby requiring a force for mounting and removal of the device from a valve head.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
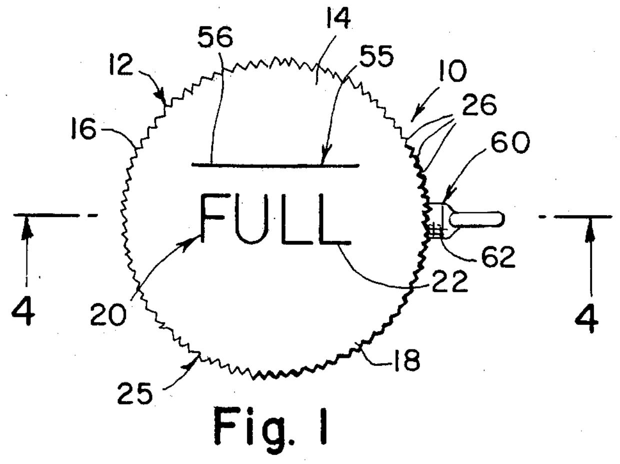
FIG. 1 is a top view of the indicating device in accordance with the present invention.
Figure 2:
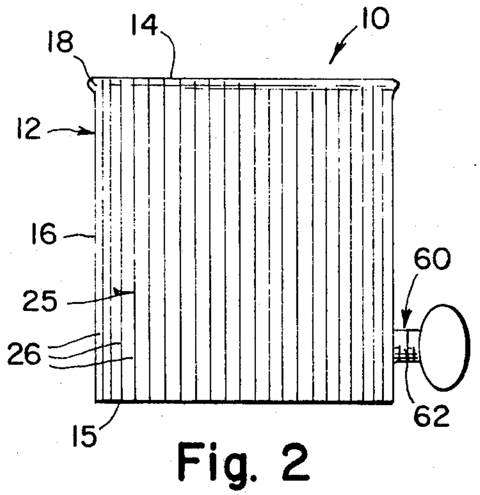
FIG. 2 is a side view of the device.
Figure 4:
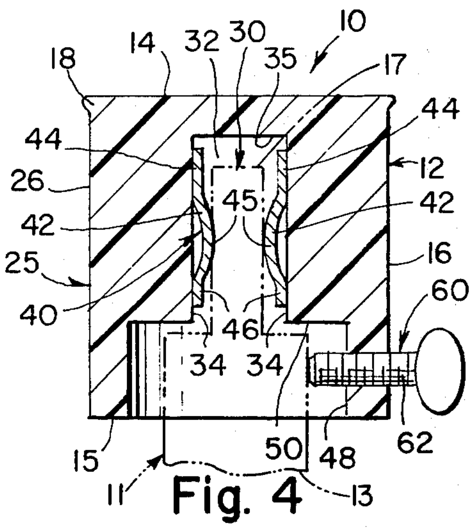
FIG. 4 is a sectional view taken along line 4-4 of FIG. 1.
Figure 3:
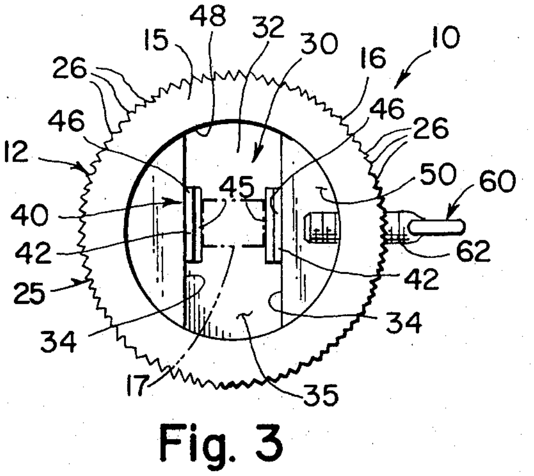
FIG. 3 is a bottom view of the device.

Referring to the drawings, FIGS. 1-4 illustrate an indicating device 10 for a tank 11 containing a valve 13 having a head 17 for opening and closing the valve 13 in a conventional manner. The tank 11 may take various forms and shapes that are well known and in use today in both hospitals and other locations. The device 10 includes a body portion 12 having a top or upper end 14 and a spaced apart bottom end 15 with a peripheral vertical surface 16 extending therebetween. An upper bead or rim 18 may be provided at the top end 14. The body portion 12 may be produced from a variety of plastic materials of different color.

Indicia means 20 is provided on the top end 14 of the body portion 12 and serves the purpose to indicate to the user the status of the tank 11. Accordingly, the indicia means 20 may include the word "FULL", indicated by numeral 22. The word "FULL" may be in red so as to be clearly visible.

To facilitate the mounting and removal of the body portion 12, gripping means 25 is provided on the peripheral surface 16 of the body portion 12. The gripping means 25 may include a plurality of vertically extending ribs 26 adapted to be readily engaged by the user of the device. The ribs 26 provide the necessary frictional gripping surface to readily move the indicating device 10 either upwardly or downwardly.

Enclosing means 30 is provided and extends vertically in the body portion 12 and upwardly from the bottom end 15 thereof. The enclosing means 30 includes a cavity 32 having a pair of vertically extending spaced apart side walls 34 and terminating in an upper cavity wall 35. The cavity walls 34 are adapted to receive therebetween the valve head such that vertical mounting and removal of the body portion is obtainable by utilization of the gripping means 25.

To releasably secure the indicating device 10 to the valve head, retaining means 40 is provided within the cavity 32 for frictional engagement with the valve head 17. The retaining means 40 may include a leaf spring 42 secured at one end 44 to the cavity wall 34 and having a bulged or outwardly extending intermediate section 45 for engagement with the valve head. The forward end 46 of each leaf spring 42 may conform to the wall 34 of the cavity 30 to facilitate the initial insertion therein in order to apply the desired compressive force required.

The indicating device 10 further includes an axial bore 48 extending from the bottom end 15 and terminating in an upper wall or end 50 that merges with the cavity 32. The axial bore 48 may extend in coaxial alignment with the outer wall 16 of the body portion 12. The axial bore 48 is adapted to receive a portion of the valve 11 therein, such that the circular configuration of the outer wall 16 is centered relative to the bore 48.

To guide the user, alignment means 55 has been provided on the top end 14 of the indicating device 10. The alignment means 55 is utilized to orient the proper direction for utilization of the enclosing means 30 relative to the valve head 17. The alignment means may include a marker in the form of a bar, identified by numeral 56, to guide the user. As illustrated in FIG. 1, the bar 56 may extend parallel to the word "FULL" and parallel to one of the cavity walls 34.

To further assure that the indicating device is not inadvertently removed, locking means 60 is provided and operatively associated with the body portion 12. The locking means 60 may include a threaded fastener 62, such as a thumbscrew, extending transversely through the body portion 12 and within the axial bore 48. In this manner the threaded fastener 62 may be externally adjustable.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. An indicating device for a pressurized tank containing a valve having a head for opening and closing said valve, said device comprising:

a. a body portion having a top end and spaced apart bottom end with a peripheral surface therebetween, b. indicia means on said top end of said body portion to selectively indicate the amount of fluid in said tank, c. gripping means on said peripheral surface to facilitate mounting and removal of said body portion from the valve head, d. enclosing means extending vertically in said body portion upwardly from said bottom end, said enclosing means including a cavity having a pair of vertically extending spaced apart cavity walls adapted to receive therebetween the valve head, such that vertical mounting and removal of said body portion on the valve head by said gripping means is obtainable, e. retaining means connected to at least one of said cavity walls and extending within said cavity and adapted for releasably securing by frictional engagement said body portion to the valve head thereby requiring a force applied to said gripping means for mounting and removal of the device from a valve head, and f. said retaining means comprises a first leaf spring secured at one end to said cavity wall and bulged for engagement with the valve head, and a second leaf spring secured at one end to said opposite cavity wall and bulged for engagement with the valve head.

2. An indicating device as in claim 1, wherein said gripping means includes vertically extending ribs on said peripheral surface.

3. An indicating device as in claim 1, and further including alignment means on said top end so as to permit the user to orient said cavity walls in the proper direction for utilization of said enclosing means relative to the valve head.

4. An indicating device as in claim 3, wherein said indicia means includes the word "FULL", and said alignment means includes a line parallel to said word.

5. An indicating device as in claim 1, and further including an axial bore extending from said bottom end and terminating at said cavity and adapted to receive a portion of the valve therein.

6. An indicating device as in claim 5, wherein said bore and said peripheral surface are circular and in coaxial alignment with each other.

7. An indicating device as in claim 1, and further including locking means operatively associated with said body portion for engaging the valve head so as to prevent accidental removal thereof.

8. An indicating device as in claim 7, wherein said locking means includes a threaded fastener extending transversely through said body portion and adjustable externally thereof.

9. An indicating device for a pressurized tank containing a valve having a head for opening and closing said valve, said device comprising:

a. a body portion having a top end and spaced apart bottom end with a peripheral surface therebetween, b. indicia means on said top end of said body portion to selectively indicate the amount of fluid in said tank, c. gripping means on said peripheral surface to facilitate mounting and removal of said body portion from the valve head, d. enclosing means extending vertically in said body portion upwardly from said bottom end, said enclosing means including a cavity having a pair of vertically extending spaced apart cavity walls adapted to receive therebetween the valve head, such that vertical mounting and removal of said body portion on the valve head by said gripping means is obtainable, e. retaining means connected to at least one of said cavity walls and extending within said cavity and adapted for releasably securing by frictional engagement said body portion to the valve head thereby requiring a force applied to said gripping means for mounting and removal of the device from a valve head, f. alignment means on said top end so as to permit the user to orient said cavity walls in the proper direction for utilization of said enclosing means relative to the valve head, g. said indicia means includes the word "FULL", and said alignment means includes a line parallel to said word, h. an axial bore extending from said bottom end and terminating at said cavity and adapted to receive a portion of the valve therein, and i. locking means operatively associated with said body portion for engaging the valve head so as to prevent accidental removal thereof.

* * * * *